US 9,641,794 B2

(12) United States Patent
Wang (10) Patent No.: US 9,641,794 B2
(45) Date of Patent: May 2, 2017

(54) SMUDGE REMOVAL

(71) Applicant: AVIGILON FORTRESS CORPORATION, Vancouver (CA)

(72) Inventor: Ping Wang, Warren, NJ (US)

(73) Assignee: AVIGILON FORTRESS CORPORATION, Vancouver (CA)

( * ) Notice: Subject to any disclaimer, the term of this patent is extended or adjusted under 35 U.S.C. 154(b) by 0 days.

(21) Appl. No.: 14/989,222

(22) Filed: Jan. 6, 2016

(65) Prior Publication Data

US 2016/0203368 A1 Jul. 14, 2016

Related U.S. Application Data

(60) Provisional application No. 62/101,755, filed on Jan. 9, 2015.

(51) Int. Cl.
| | |
|---|---|
| *H04N 5/911* | (2006.01) |
| *G06K 9/00* | (2006.01) |
| *G06K 9/40* | (2006.01) |
| *G06K 9/46* | (2006.01) |

(52) U.S. Cl.
CPC ......... *H04N 5/911* (2013.01); *G06K 9/00711* (2013.01); *G06K 9/40* (2013.01); *G06K 9/4671* (2013.01)

(58) Field of Classification Search
CPC ...... H05N 5/911; G06K 9/00711; G06K 9/40; G06K 9/4671
See application file for complete search history.

(56) References Cited

U.S. PATENT DOCUMENTS

2012/0262572 A1* 10/2012 Cudak ................ H04N 13/0007
348/135

OTHER PUBLICATIONS

Antoni B. Chan et al., "Variational Layered Dynamic Textures", In IEEE Conference on Computer Vision and Pattern Recognition, 2009, pp. 1062-1069.
Miguel Granados et al., "Background Inpainting for Videos with Dynamic Objects and a Free-moving Camera", In Computer Vision—ECCV, 2012, pp. 682-695.

* cited by examiner

*Primary Examiner* — Huy T Nguyen
(74) *Attorney, Agent, or Firm* — MH2 Technology Law Group, LLP (57) ABSTRACT

Some embodiments remove an obstruction, e.g., a smudge, from a video. The video may be broken down into layers, and every pixel in space/time may be assigned a layer. Typically, the obstruction will be on one layer, and the background and foreground will be on other layers. Some embodiments detect which layer is generated by the smudge. Some embodiments use a motion model as a judging criteria for deciding the smudge layer.

24 Claims, 7 Drawing Sheets

SMUDGE REMOVAL

RELATED APPLICATION

This application claims priority to, and the benefit of, U.S. Provisional Patent Application No. 62/101,755 entitled "Smudge Removal" and filed Jan. 9, 2015, the entirety of which is hereby incorporated by reference.

BACKGROUND

In the past decade, tremendous progress has been made in imaging technologies. Not only have the resolution and sensitivity of imaging sensors improved greatly, but also the hardware costs have decreased. There has also been a corresponding exponential increase in deployment of a variety of imaging sensors for surveillance and situational awareness. However, various conditions during the imaging process, such as weather conditions and imaging system artifacts, still present challenges for automatic image data processing.

Smudges on a lens may be recorded in a video taken by an imaging system. For example, when an imaging system is exposed to weather (e.g. an imaging system on the outside of a building, or on a vehicle) water droplets, or particulate matter such as dust, dirt, or smoke can easily get splashed or blown onto the lens, resulting in smudges on the recorded video. Many other factors, such as fingerprints, contribute to smudge appearances in videos as well. Smudges may be of varying shapes, sizes and appearances.

Such defects complicate the video and reduce the performance of existing intelligent video processing capabilities. In order to prepare existing video for processing by automatic video processing algorithms, current practice requires a person to edit a pre-recorded video manually. This is a time-consuming and labor-intensive procedure. The person has to use editing software to manually remove smudges and, in some cases, reticle lines, if the lens includes these. Despite this intensive effort, manual editing still only provides marginal improvement in video quality, with many inconsistencies still remaining within the video scene.

SUMMARY

According to some embodiments, a computer implemented image processing method of removing an obstruction from a video image stream is presented. The method includes obtaining an electronic representation of a video image stream including a plurality of pixels, each pixel of the plurality of pixels including a time and a location; modeling, by at least one electronic processor, each of a plurality of video image layers as dynamic textures; assigning, by at least one electronic parallel processor, each of the plurality of pixels to one of the plurality of video image layers, where each layer represents scene elements that are a certain distance from a camera image plane of the video image stream; determining, by at least one electronic processor, a particular layer of the plurality of video image layers in which the obstruction occurs; inpainting, by at least one electronic processor, on the particular layer, a region of the video image stream corresponding to the obstruction; and providing the video stream subsequent to the video inpainting.

Various optional features of the above embodiments include the following. The obstruction may include a smudge on a lens of an imaging system that produced the video image stream. The lens may be mounted outside a building, or the lens may be mounted outside a vehicle. The lens may be mounted outside a submarine, and a periscope of the submarine may include the lens. The modeling each of a plurality of video image layers as a dynamic texture may include modeling each of a plurality of video image layers using a respective linear dynamic system. The assigning each of the plurality of pixels to one of the plurality of video image layers may include applying a layered dynamic texture model. The assigning each of the plurality of pixels to one of the plurality of video image layers may further include implementing a variational approximation of an expectation-maximization algorithm. The applying the layered dynamic texture model may include forming a Markov random field representing a plurality of discrete hidden variables. The video image stream may include a representation of a reticle, and the determining a particular layer of the plurality of video image layers in which the obstruction occurs may include comparing a dynamics of a video image layer including the reticle to a dynamics of each of the plurality of video image layers. The determining a particular layer of the plurality of video image layers in which the obstruction occurs y include comparing each of the plurality of video image layers to a supervised learning regression model of motion. The assigning, by at least one electronic parallel processor, each of the plurality of pixels to one of the plurality of video image layers may include assigning, by at least one electronic video processor, each of the plurality of pixels to one of the plurality of video image layers. The inpainting, on the particular layer, a region of the video image stream corresponding to the obstruction may include, for each of a second plurality of pixels including the obstruction, identifying a corresponding candidate frame from the video image stream in which the pixel of the second plurality of pixels is not present.

According to some embodiments, an image processing system for removing an obstruction from a video image stream is presented. The system includes at least one electronic interface configured to obtain an electronic representation of a video image stream including a plurality of pixels, each pixel of the plurality of pixels including a time and a location; at least one electronic processor configured to model each of a plurality of video image layers as dynamic textures; at least one electronic parallel processor configured to assign each of the plurality of pixels to one of the plurality of video image layers, where each layer represents scene elements that are a certain distance from a camera image plane of the video image stream; at least one electronic processor configured to determine a particular layer of the plurality of video image layers in which the obstruction occurs; at least one electronic processor configured to inpaint on the particular layer, a region of the video image stream corresponding to the obstruction; and at least one electronic interface configured to provide the video stream subsequent to the video inpainting.

Various optional features of the above embodiments include the following. The obstruction may include a smudge on a lens of an imaging system that produced the video image stream. The lens may be mounted outside a building, or the lens may be mounted outside a vehicle. The lens may be mounted outside a submarine, and a periscope of the submarine may include the lens. The at least one electronic processor configured to model each of a plurality of video image layers as a dynamic texture may include at least one electronic processor configured to model each of a plurality of video image layers using a respective linear dynamic system. The at least one electronic parallel processor configured to assign each of the plurality of pixels to one of the plurality of video image layers may include at least one electronic parallel processor configured to apply a layered dynamic texture model. The at least one electronic parallel processor configured to assign each of the plurality of pixels to one of the plurality of video image layers further may include at least one electronic parallel processor configured to implement a variational approximation of an expectation-maximization algorithm. The at least one electronic parallel processor configured to implement the layered dynamic texture model may include at least one electronic parallel processor configured to form a Markov random field representing a plurality of discrete hidden variables. The video image stream may include a representation of a reticle, and the at least one electronic processor configured to determine a particular layer of the plurality of video image layers in which the obstruction occurs may include at least one electronic processor configured to compare a dynamics of a video image layer including the reticle to a dynamics of each of the plurality of video image layers. The at least one electronic processor configured to determine a particular layer of the plurality of video image layers in which the obstruction occurs may include at least one electronic processor configured to compare each of the plurality of video image layers to a supervised learning regression model of motion. The at least one electronic parallel processor configured to assign each of the plurality of pixels to one of the plurality of video image layers may include at least one electronic video processor configured to assign each of the plurality of pixels to one of the plurality of video image layers. The at least one electronic processor configured to inpaint, on the particular layer, a region of the video image stream corresponding to the obstruction may include at least one electronic processor configured to identify, for each of a second plurality of pixels including the obstruction, a corresponding candidate frame from the video image stream in which the pixel of the second plurality of pixels is not present

DESCRIPTION OF DRAWINGS

The accompanying drawings, which are incorporated in and constitute a part of this specification, illustrate implementations of the described technology. In the figures.

DETAILED DESCRIPTION

Reference will now be made in detail to example implementations, which are illustrated in the accompanying drawings. Where possible the same reference numbers will be used throughout the drawings to refer to the same or like parts.

Some embodiments detect and remove from a video (e.g., video taken through a submarine periscope) smudges of any shape, any size, and any appearance, without utilizing any pre-processing information as to the number, shape, size, and appearance of the smudges. The video may be obtained from an imaging system.

The video may include any sort of scene. For example, where the video is taken from a sea-going vessel, a typical video may contain mostly water and/or sky in the background, and a target object such as a ship or a landmark in the foreground, with occasional waves in the scene. Each scene element is within a certain distance to the camera image plane. Such distances define a layered relationship among these scene components. Through the disclosed techniques, each layer contains one or more scene components, and every pixel in the layer undergoes some local dynamic process.

Thus, the layered representation of the disclosed techniques segments the video into multiple spatio-temporal volumes; each volume is governed by its own dynamics and has consistent texture within itself. Without the need for recovering depth, the smudge also belongs to one of the layers, because its motion and texture are different from the rest of the scene, such as camera motion and other scene element's motion.

Some embodiments identify which layer belongs to the smudge through the use of motion cues for the identification. Similar to reticles, which may be found on some lenses (e.g., a lens of a periscope), smudges stay relatively static with respect to the camera lens. Thus, some embodiments leverage a layered dynamic texture approach for smudge layer detection. Alternately, some embodiments use a supervised learning technique to identify the smudge layer.

Once the video is parsed into layers and the smudge-bearing layer is identified, some embodiments remove the smudge through the use of video inpainting. Such techniques estimate the pixel values belonging to the scene elements occluded by smudges by ensuring smoothness in space and time, while maintaining global consistency in scene content. An underlying (and reasonable) assumption of a successful application of video inpainting for smudge removal is that the part occluded by the smudges will be visible in some other frames of the video, and the smudge boundary provided by layered segmentation is as tight as possible.

These and other technique details are presented herein.

Figure 1:
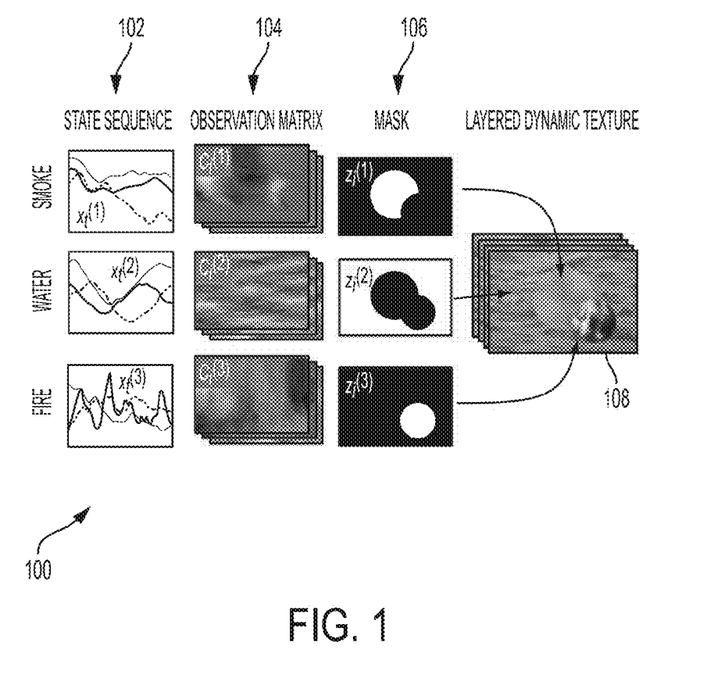
FIG. 1 is a schematic diagram depicting a synthetic video with three dynamic textures according to some embodiments.

FIG. 1 is a schematic diagram 100 depicting a synthetic video 108 with three dynamic textures according to some embodiments. Some embodiments use the layered dynamic texture (LDT) techniques for the detection of smudges in videos, e.g., videos taken through a periscope. LDT is a generative model that represents video as a collection of stochastic layers of different appearances and dynamics. Each layer is modeled as a temporal texture sampled from a different linear dynamic system. Regions of the video are assigned to each layer based on a Markov random field model.

Thus, FIG. 1 illustrates a video 108 represented by multiple layers of dynamic texture. In particular, video 108 includes three dynamic textures: smoke, water and fire. Each texture has its own dynamic and appearance, and is modeled with its own evolving state sequence 102 and observation matrix 104. The textures are then masked using masks 106 and composited to form layered video 108. The synthetic video 108 is thus a composition of the three layers, delimited by masks 106.

Embodiments may operate on videos similar to the synthetic video 108 of FIG. 1.

Figure 2:
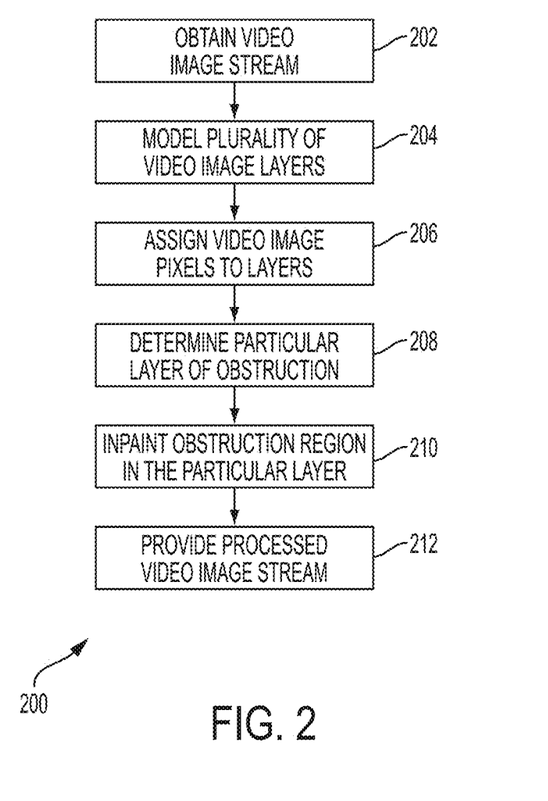
FIG. 2 is a flowchart illustrating a method 200 according to some embodiments.

FIG. 2 is a flowchart illustrating a method 200 according to some embodiments. FIG. 2 will be described presently and in reference to FIGS. 3-7. Method 200 of FIG. 2 may be implemented using the hardware shown and described in reference to FIG. 7, for example. According to some embodiments, method 200 may be implemented to process video taken through an imaging system of a vehicle in order to electronically remove smudges resulting from material such as water on a lens of the imaging system. In some embodiments, the vehicle may be a ship or a submarine. In some embodiments, the imaging system may include a periscope.

At block 202, method 200 obtains a video image stream. The video image stream may be obtained from persistent memory, over a network, or a combination thereof, for example. Alternately, or in addition, the video image stream may be obtained directly from a video camera, for example. The video image stream may be in any of a variety of formats, e.g., MPEG-4.

At block 204, method 200 models a plurality of video image layers. Each modeled video image layer may each be a temporal texture sampled from a particular linear dynamic system, for example. Suitable textures include, for example, water, sky, clouds, fire, vehicle surfaces (various types), sun, etc. Note that the actions of this block may be performed once and utilized (e.g., the layer models accessed) many times. Accordingly, for some embodiments, this block is optional.

Figure 3:
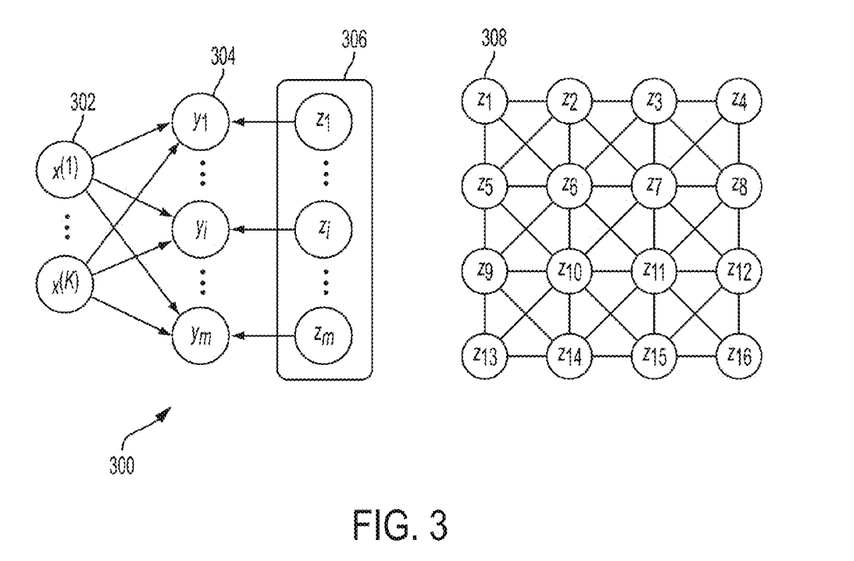
FIG. 3 depicts in schematic form a Layered Dynamic Texture (LDT) technique for assigning video image pixels to identified video layers.
Figure 4:
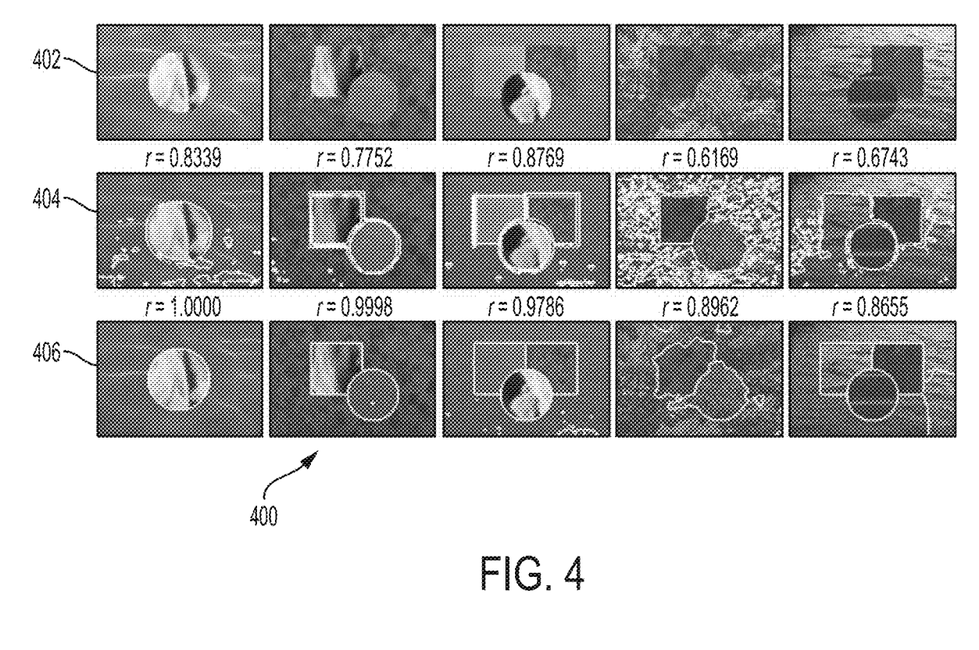
FIG. 4 shows the results of LDT application and dynamic texture mixture application on the segmentation of several synthetic videos consisting of multiple dynamic textures according to some embodiments.

At block 206, method 200 assigns video image stream pixels to the layers of block 206 (or similar layers previously obtained). The description of block 206 will proceed in reference to FIGS. 2, 3, 4, and 5. Thus, FIG. 3 depicts a schematic diagram 300 of a technique (layered dynamic texture, or "LDT") for assigning video image pixels to the layers of block 204. FIG. 4, as will be seen, depicts an application of LDT, and FIG. 5, as described below, depicts an application of an alternate technique, temporally-switching LDT, for accomplishing the actions of block 206. A detailed description of LDT follows immediately below.

Layered Dynamic Texture for Block 206

Denote by K the number of layers expected in the video (e.g., according to some embodiments, four). Each layer has its own state variable 302, represented by $x^{(j)}$, $j \in \{1, \ldots, K\}$, where n is the dimension of the state. Pixel value is represented by $\{y_{i,t}\}$ (302) at time t at location i. The term $y_{i,t}$ is assigned to one of the K layers through the discrete hidden variable $z_i$ (306). The assignment of pixel values to $y_{i,t}$ (304) leads to the segmentation in the space-time domain of the videos. The hidden variable $z_i$ (306) is introduced to enable the assignment of different dynamics to different regions of the video. Conditioned on its state, each video region is a standard dynamic texture. The collection of $z_i$ (306) is modeled as a Markov Random Field (MRF) (308), to ensure spatial smoothness of the segmentation. That is, FIG. 3 depicts a 4×4 MRF 308.

Under the reasonable assumption that each pixel has zero-mean over time (i.e., mean-subtracted), the dynamic model and measurement model may be represented respectively as follows:

$$x_t^{(j)} = A^{(j)} x_{t-1}^{(j)} + v_t^{(j)}, j \in \{1, \ldots, K\}$$

$$y_{i,t} = C_i^{(z_i)} x_t^{(z_i)} + w_{i,t}, i \in \{1, \ldots, K\}$$

In the above, the term $C_i^{(j)} \in R^{1 \times n}$ represents the transformation from the hidden state to the observed pixel for each pixel $y_i$ and each layer j. Both the dynamic model and observation model have Gaussian noises, i.e., $v_t^{(j)} \sim N(0, Q^{(j)})$, $w_{i,t} \sim N(0, r^{z_i})$, where $Q^{(j)}$ is n×n, and $r^{(j)} > 0$. The initial state is reasonably assumed to be $x_1^{(j)} \sim N(\mu^{(j)}, Q^{(j)})$. Overall, each layer may be parameterized by $\Theta_j = \{A^{(j)}, Q^{(j)}, C^{(j)}, r^{(j)}, \mu^{(j)}\}$. The MRF's potential function over $z_i$ may be represented as follows, by way of non-limiting example:

$$V_i(z_i) = \alpha_i^{(z_i)}, V_i(z_i, z_{i'}) = \gamma_1^{I(z_i, z_{i'})} \gamma_2^{1 - I(z_i, z_{i'})}$$

where $l(z_i, z_{i'}) = 1$ if $z_i = z_{i'}$, and 0 otherwise. It assigns higher probability to configurations with neighboring pixels in the same layer.

The parameters of the LDT model may be learned by maximizing the likelihood, given a training video $Y = \{y_{i,t}\}$, represented as follows.

$$\Theta^* = \underset{\Theta}{\mathrm{argmax}} \log p(Y) = \underset{\Theta}{\mathrm{argmax}} \sum_{X,Z} P(X, Y, Z).$$

This may be estimated via an expectation-maximization algorithm, which may, by way of non-limiting example, iterate between the following expectation and maximization steps:

$$E\text{-step: } Q(\Theta, \hat{\Theta}) = \mathbb{E}_{X,Y|Y,\hat{\Theta}}[\log p(X, Y, Z; \Theta)]$$

$$M\text{-step: } \hat{\Theta}' = \mathrm{argmax}_\Theta Q(\Theta, \hat{\Theta})$$

The expectation-maximization algorithm estimates the unknown parameters and assigns the pixels to layers iteratively, until the estimation does not change much (e.g., a metric of the change does not exceed a threshold) or after a few pre-defined iterations. The M-step specifies the assignment of a given pixel to a layer.

Exact inference for the expectation-maximization algorithm may be intractable because it uses the marginalization over hidden variable Z of the MRF. A low-complexity alternative to the exact inference is to rely on a variational approximation. This may include a direct approximation of the posterior $p(X, Z|Y)$ with a distribution $q(X, Z)$ that is within some class of tractable probability distribution $\mathcal{F}$. Given an observation, the variational approximation minimizes the Kullback-Leibler divergence (KL-divergence) between the approximated and the exact posteriors:

$$q^*(X, Z) = \underset{q \in \mathcal{F}}{\mathrm{argmin}} D(q(X, Z) \| p(X, Z|Y)) = \underset{q \in \mathcal{F}}{\mathrm{argmin}} L(q(X, Z))$$

$$\mathcal{L}(q(X, Z)) = \int q(X, Z) \log \frac{q(X, Z)}{p(X, Y, Z)} dX dZ.$$

Assuming independence between assignment $z_i$ and state $x^j$, it follows that optimal factorial functions may be represented a follows, by way of non-limiting example:

$$\log q(x^{(j)}) = \sum_{i=1}^{m} h_i^{(j)} \log p(y_i | x^{(j)}, z_i = j) + \log p(x^{(j)}) - \log \mathcal{Z}_q^{(j)},$$

$$\log q(z_i) = \sum_{j=1}^{K} z_i^{(j)} \log h_i^{(j)}.$$

In the above, the terms $h_i^{(j)}$ are variational parameters, which may be represented as follows, by way of non-limiting example:

$$h_i^{(j)} = \mathbb{E}_q[z_i^{(j)}] = \frac{\alpha_i^{(j)} g_i^{(j)}}{\sum_{k=1}^{K} \alpha_i^{(k)} g_i^{(k)}},$$

$$\log g_i^{(j)} = \mathbb{E}_q[\log p(y_i|x^{(j)}, z_i = j] + \sum_{(i,i') \in \varepsilon} h_{i'}^{(j)} \log \frac{\gamma_1}{\gamma_2}.$$

The E-step can therefore be represented as follows, by way of non-limiting example.

$$\hat{x}_t^{(j)} \approx \mathbb{E}_{q^*}[x_t^{(j)}], \hat{P}_{t,t}^{(j)} \approx \mathbb{E}_{q^*}[x_t^{(j)} x_t^{(j)T}],$$

$$\hat{z}_i^{(j)} \approx h_i^{(j)}, \hat{P}_{t,t-1}^{(j)} \approx \mathbb{E}_{q^*}[x_t^{(j)} x_{t-1}^{(j)T}],$$

$$\hat{x}_{t|i}^{(j)} = \mathbb{E}_{X|Y,z_i=j}[x_t^{(j)}] \approx \mathbb{E}_{q^*}[x_t^{(j)}],$$

$$\hat{P}_{t,t|i}^{(j)} = \mathbb{E}_{X|Y,z_i=j}[x_t^{(j)} x_t^{(j)T}] \approx \mathbb{E}_{q^*}[x_t^{(j)} x_t^{(j)T}].$$

And the M-step estimates the approximation to the maximum a posteriori layer assignment may be represented as follows, by way of non-limiting example.

$$Z^* = \arg\max_Z p(Z|Y), z_i^* = \arg\max_j h_i^{(j)}.$$

Video segmentation based on LDT per block 206 of FIG. 2 demonstrates some nice properties over the state-of-the-art work. FIG. 4, for example, shows the results 400 of LDT application 406 and dynamic texture mixture (DTM) application 404 on the segmentation of several synthetic videos 402 consisting of multiple dynamic textures. (The inventor has discovered that LDT is superior to DTM for modeling video texture. For example, DTM lacks the discrete hidden variable of LTD that enables the assignment of different dynamics to different regions of the video.) FIG. 4 shows that LDT application 406, in comparison to the DTM application 404, has more precise segmentation boundaries, less noisy segmentations due to the MRF prior, and no errors of marking texture borders as segments. Such performance is desired in automatic smudge detection in videos, because the shapes of smudges may be unknown and irregular. LDT application 406 may recover the boundary of smudges as accurately as possible, which provides a good start for removing smudges with video inpainting techniques.

Temporally-Switching Layered Dynamic Texture for Block 206

To handle the case that smudges in the videos may change shape (and sometimes change appearance as well), some embodiments may use a temporally-switching LDT (TS-LDT) to accomplish block 206 of method 200 (instead of LDT). The TS-LDT technique allows the layer shape and MRF to change over time. That is, in TS-LDT, a pixel is assigned to one of the layers at each time instance, through the hidden variable. Therefore, TS-LDT can model changes in both space and time.

In TS-LDT, a pixel is assigned to one of the layers at each time instance, through the hidden variable $y_{i,t}$. Again, the collection of the assignment variable $Z=\{z_{i,t}\}$ is modeled as a MRF to ensure both spatial and temporal smoothness. The model equations may be represented as follows, by way of non-limiting example:

$$x_t^{(j)} = A^{(j)} x_{t-1}^{(j)} + v_t^{(j)}, j \in \{1, \ldots, K\}$$

$$y_{i,t} = C_i^{(z_{i,t})} x_t^{(z_{i,t})} + w_{i,t} + \gamma_i^{(z_{i,t})}, i \in \{1, \ldots, m\}$$

where $C_i^{(j)} \in \mathbb{R}^{1 \times n}$, $v_t^{(j)} \sim N(0, Q^{(j)})$, $x_1^{(j)} \sim N(\mu^{(j)}, Q^{(j)})$ are the same as LDT. The difference is in the observation process. Note that $w_{i,t} \sim N(0, r^{z_i})$, and the mean value $\gamma_i^{(j)} \in \mathbb{R}$, for pixel $i$ in layer $j$ is explicitly included. The mean values are specified for each layer, because a pixel may switch layer at any time. The MRF structure changes from the 2D lattice structure in LDT to 3D, with additional edges connecting nodes between frames according to the following potential function:

$$V_{t,t'}(z_{i,t}, z_{i,t'}) = \begin{cases} \beta_1, & z_{i,t} = z_{i,t'} \\ \beta_2, & z_{i,t} \neq z_{i,t'} \end{cases}$$

The parameter learning in TS-LDT is similar to that of LDT. The E-step is conditioned on $z_{i,t}=j$ as follows, for example.

$$\hat{x}_t^{(j)} = \mathbb{E}_{X|Y}[x_t^{(j)}], \hat{z}_{i,t}^{(j)} = \mathbb{E}_{Z|Y}[z_{i,t}^{(j)}],$$

$$\hat{P}_{t,t}^{(j)} = \mathbb{E}_{X|Y}[P_{t,t}^{(j)}], \hat{P}_{t,t-1}^{(j)} = \mathbb{E}_{Z|Y}[P_{t,t-1}^{(j)}],$$

$$\hat{x}_{t|i}^{(j)} = \mathbb{E}_{X|Y,z_{i,t}=j}[x_t^{(j)}], \hat{P}_{t,t|i}^{(j)} = \mathbb{E}_{X|Y,z_{i,t}=j}[P_{t,t}^{(j)}],$$

In the M-step, the parameters are updated according to $$C_i^{(j)*} = \Gamma_i^{(j)T} \Phi_i^{(j)-1}, A^{(j)*} = \varphi^{(j)} \phi_1^{(j)-1}, \mu^{(j)*} = \hat{x}_1^{(j)},$$

$$r^{(j)*} = \frac{1}{N_j} \sum_{i=1}^{m} \left[ \sum_{t=1}^{T} \hat{z}_{i,t}^{(j)} (y_{i,t} - \gamma_i^{(j)})^2 - C_i^{(j)*} \Gamma_i^{(j)} \right],$$

$$Q^{(j)*} = \frac{1}{T} \left[ \hat{P}_{1,1}^{(j)} - \mu^{(j)*} (\mu^{(j)*})^T + \phi_2^{(j)} - A^{(j)*} \psi^{(j)T} \right],$$

$$\gamma_i^{(j)*} = \frac{1}{\sum_{t=1}^{T} \hat{z}_{i,t}^{(j)} y_{i,t}} \left( \sum_{t=1}^{T} \hat{z}_{i,t}^{(j)} y_{i,t} - C_i^{(j)} \xi_i^{(j)} \right).$$

The aggregated statistics may be represented as:

$$\phi_1^{(j)} = \sum_{t=1}^{T-1} \hat{P}_{t,t}^{(j)}, \phi_2^{(j)} = \sum_{t=2}^{T} \hat{P}_{t,t}^{(j)},$$

$$\phi_i^{(j)} = \sum_{t=1}^{T} \hat{z}_{i,t}^{(j)} P_{t,t|i}^{(j)}, \psi^{(j)} = \sum_{t=2}^{T} \hat{P}_{t,t-1}^{(j)},$$

$$\hat{N}_j = \sum_{t=1}^{T} \sum_{i=1}^{m} \hat{z}_{i,t}^{(j)}, \xi_i^{(j)} = \sum_{t=1}^{T} \hat{z}_{i,t}^{(j)} \hat{x}_{t|i}^{(j)},$$

$$\Gamma_i^{(j)} = \sum_{t=1}^{T} \hat{z}_{i,t}^{(j)} (y_{i,t} - \gamma_i^{(j)}) x_{t|i}^{(j)}.$$

The inference may be achieved via variational approximation, similar to LDT. Under the reasonable assumption of statistical independence between pixel assignments and state variables, it follows that, by way of non-limiting example:

$$Q(X, Z) = \prod_{j=1}^{K} q(x^{(j)}) \prod_{i=1}^{m} \prod_{t=1}^{T} q(z_{i,t}).$$

The optimal factorial distributions may be represented as follows, by way of non-limiting example:

$$\log q(x^{(j)}) = \sum_{t=1}^{T} \sum_{i=1}^{m} h_{i,t}^{(j)} \log p(y_{i,t}|x_t^{(j)}, z_{i,t}=j) + \log p(x^{(j)}) - \log Z_q^{(j)},$$

$$\log q(z_{i,t}) = \sum_{j=1}^{K} z_{i,t}^{(j)} \log h_{i,t}^{(j)},$$

with the following variational parameters:

$$h_{i,t}^{(j)} = \mathbb{E}_q[z_{i,t}^{(j)}] = \frac{\alpha_{i,t}^{(j)} g_{i,t}^{(j)}}{\sum_{k=1}^{K} \alpha_{i,t}^{(k)} g_{i,t}^{(k)}}, \text{ and}$$

$$\log g_{i,t}^{(j)} = \mathbb{E}_q[\log p(y_{i,t}|x_{i,t}^j, z_{i,t} = j)] +$$

$$\sum_{(i,i') \in \varepsilon_i} h_{i,i'}^{(j)} \log \frac{\gamma_1}{\gamma_2} + \sum_{(t,t') \in \varepsilon_t} h_{i,t'}^{(j)} \log \frac{\beta_1}{\beta_2}.$$

Figure 5:
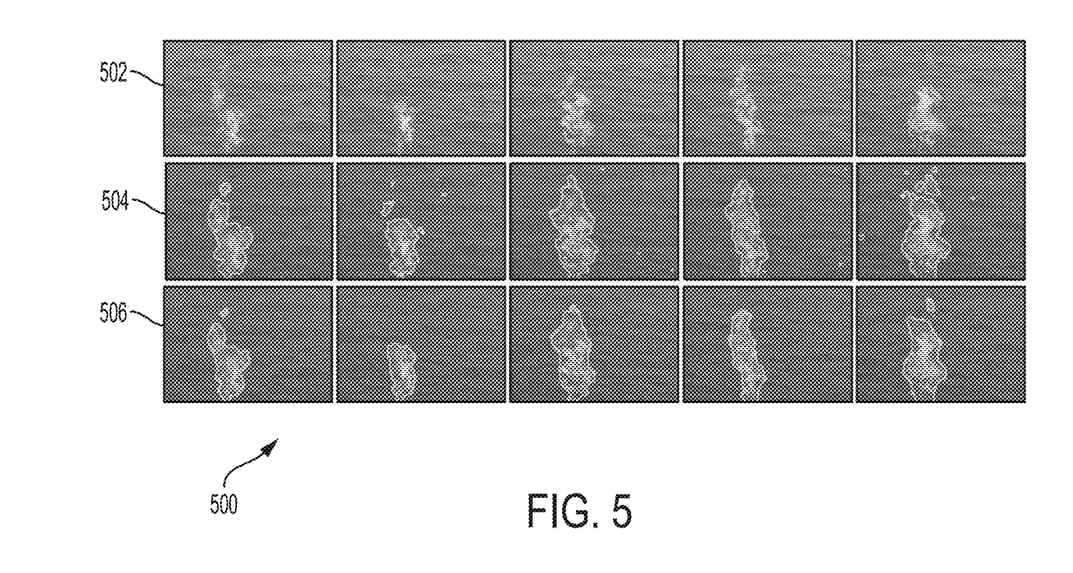
FIG. 5 presents results of an experiment on a synthetic video consisting of water background and a foreground of moving region of fire according to some embodiments.

A comparison 500 of an application of TS-LDT to an application of dynamic texture mixture (DTM) appears in FIG. 5. Compared with LDT, the TS-LDT is more time-consuming. However, it leads to segmentation with tighter boundaries and less spurious segments. FIG. 5 presents results of an experiment on a synthetic video consisting of water background and a foreground of moving region of fire. Row 502 depicts unaltered synthetic video, row 504 depicts application of DTM, and row 506 depicts application of LS-LDT.

Thus, whether block 206 applies LDT or TS-LDT, once the actions of block 206 have been performed, method 200 has assigned each pixel from each frame from the video of block 202 to a specific layer.

Note that portions or the entirety of block 206 may be performed by parallel processor, e.g., video processor. Such processors include multiple cores, each capable of performing calculations independently. Among other process portions amenable to implementation by parallel processor are the steps involving the MRF. Because portions of the MRF handling may be performed independently from each-other, and because portions of the MRF handling involve multiple calculations that may be performed separately, a parallel processer may be used for all or part of block 206.

At block 208, method 200 determines the particular layer on which the obstruction resides. That is, after extracting the different layers of dynamic textures, the method identifies which layer belongs to the obstruction (e.g., smudge). There are at least two ways that this may be accomplished.

The first way to determine the obstruction layer is useful for video in which a fixed image on the relevant optics exists, e.g., a reticule. Note that both the obstruction and the reticle stay static relatively to the camera lens, therefore their motion pattern will be similar to each other, but different from the rest of the video contents caused by camera and scene motion. Some embodiments check the dynamics of each layer texture, and find the one that is closest to the motion of reticle. For some embodiments, the total number of layers in a video is typically four or under; so the computation is fast even if it needs to evaluate all the layers. The first way may include three substeps as follows.

Step 1: Fitting a motion model to the dynamics of the reticle. This can include finding the center of the extracted reticle, and estimating the motion of the center using an autoregressive-moving-average (ARMA) model, e.g., represented as follows.

$$X_t = c + \varepsilon_t + \sum_{i=1}^{p} \varphi_i X_{t-i} + \sum_{i=1}^{q} \Theta_i \varepsilon_{t-i}$$

Step 2: For each dynamic texture layer, estimate its ARMA model using the trajectory of the mass center at every frame as time series input.

Step 3: Compare the distance between the ARMA of extracted reticles and the ARMA of each dynamic texture layer. Pick the layer with smallest distance as smudge layer.

The second way to determine the obstruction layer may be used for any video, regardless as to whether it includes a fixed image on the relevant optics exists, e.g., a reticule. For this technique, a training phase may be employed, in which a supervised machine learning algorithm learns to recognize smudges (or other obstructions) based on a set of training data that depicts a smudge and its movement. Note that each layer has an associated dynamic model. This second way may compare these models with learned models and detect the closest match. Suitable supervised learning techniques for the second way include, e.g., regression models.

Thus, after block 208, method 200 has identified the obstruction-bearing layer.

At block 210, method 200 inpaints the obstruction region in the layer identified at block 208. That is, given the region of obstructions for each frame, method 200 recovers the color (or intensity) values for each pixel in the region that has been occluded. Method 200 therefore uses a video inpainting technique that allows inpainting for videos with dynamic objects and a free-moving camera. A reasonable assumption is that the region to be filled in is visible in at least one other frame, even under projective distortions. Thus, inpainting may include or be prefaced by finding potential source frames and aligning and composing them into the target frame. Method 200 also takes illumination changes into account and may include a post-processing step that removes potential illumination discrepancies. Overall, block 210 may include a three step procedure for inpainting, described as follows.

Step 1: Find candidate frames that align well with the target frame. A frame-by-frame homography fitting may be used for transforming the candidate pixel to the target pixel. Rather than using a single homography, a piece-wise planary alignment may be chosen. A frame may be decomposed into multiple segments, each segment representing a plane and for which a homography is estimated. Therefore, the target scene is approximated by piecewise linear arrangement of planes. An optimum homography may be chosen as the one that minimizes the alignment error. The generation of homography depends on the feature correspondence between the target frame and the candidate frame. For adjacent frames, KLT tracker may be used to set up the correspondences between feature points. For a pair of frames with a distance, RANSAC, known in the art, may be applied to set up the correspondences between the feature points from the two frames, which are typically SURF or SIFT (both known in the art). For a target frame, $k_{max}$ homographies may be estimated. Then for each missing pixel, method 200 selects the best candidate homography as a tradeoff between the alignment error and the mismatch at the boundary between two adjacent regions aligned by different homographies. The homography that best aligns the target pixel may be found by minimizing an energy function defined on the target region with a MRF model, which may be represented as:

$$\varepsilon(K) = \sum_{p \in \Omega} E_p^1(K(p)) + \beta \sum_{(p,q) \in N(\Omega)} E_{p,q}^2(K(p), K(q))$$

where N denotes the spatial neighborhood, and $K: \Omega \to [1, \ldots, k]$ is the variable corresponding to the assignment of a homography to a missing pixel $p \in \Omega$. The parameter $\beta$ balances the data term and the smoothing term. The data term $E_p^1(K)$ measures the color differences at p between the source and the target frame if aligned by the chosen homography. The smoothing term penalizes the color discrepancies between two neighboring pixels in the source frame when they are aligned by the assigned homographies.

Step 2: Scene composition. For each pixel in the target region, a single frame is chosen from the candidate sources such that it is spatially consistent with it is neighbors inside and outside the target region. This may be done again by minimizing an energy function defined over the target region with a MRF model. As a result, every target pixel selects a best matching candidate frame. The result is a mapping between every target pixel and a candidate frame.

Step 3: Gradient fusion for handling illumination changes. After generating estimation for each target pixel, a post-processing step based on gradient fusion may be performed to address possible illumination changes, which may be done by solving the Possion equation with Dirichlet boundary conditions. To maintain temporal consistency, a regularizer that penalizes the discrepancies between reconstructed colors and their corresponding colors in the previous frame may be applied. The target pixel value may then be estimated under the temporal smoothness limit.

Variations of block 210 are possible. For example, to improve the speed for selecting candidate frames for aligning and composition, some embodiments may use variational approximation approaches over the MRF models for faster pixel value estimation. As another example, some embodiments may utilize parallel processers (e.g., video processors) for the video inpainting. Such embodiments may handle each obstruction using a different processor of the parallel processors, thereby improving speed.

Figure 6:
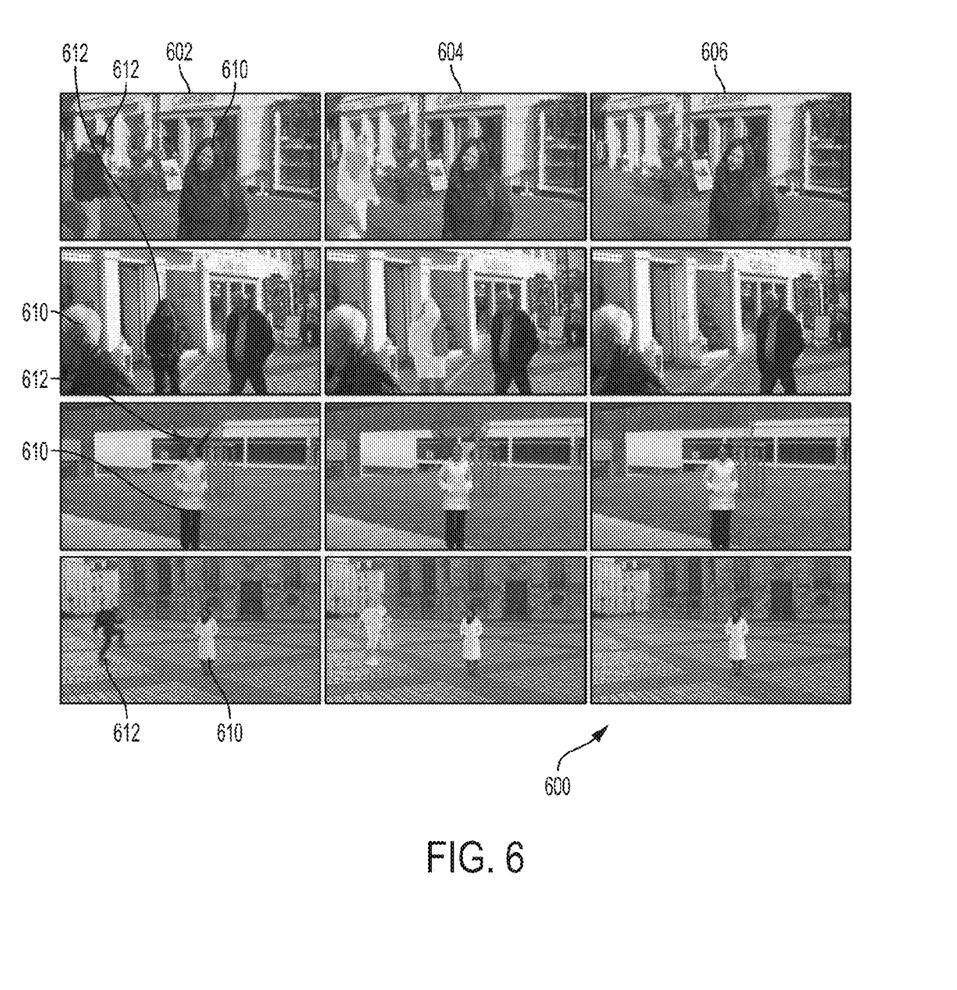
FIG. 6 shows an example of video inpainting according to some embodiments.

An example 600 of the video inpainting of block 210 is shown and described in reference to FIG. 6. Left column 602 shows the input video with masks: target region to be removed 612 is marked, and region to be reserved 610 is also marked. (Note that embodiments do not need such user-defined masks, as the obstruction will be extracted automatically by the LDT or TS-LDT method.) Middle column 604 visualizes the selected source frames for the pixel in the target region. Each shading represents one source frame. Note that matches for the missing pixels are from multiple source frames to account for perspective view changes; even the missing pixels are spatially close. Right column shows 606 the inpainting results.

At block 212, method 200 provides the processes the video image stream. The video image stream may be provided by storing in persistent memory, transferring over a network, or a combination thereof, for example. Alternately, or in addition, the video image stream may be provided by displaying directly to a viewer, for example. If provided electronically, the video image stream may be provided in any of a variety of formats, e.g., MPEG-4.

Figure 7:
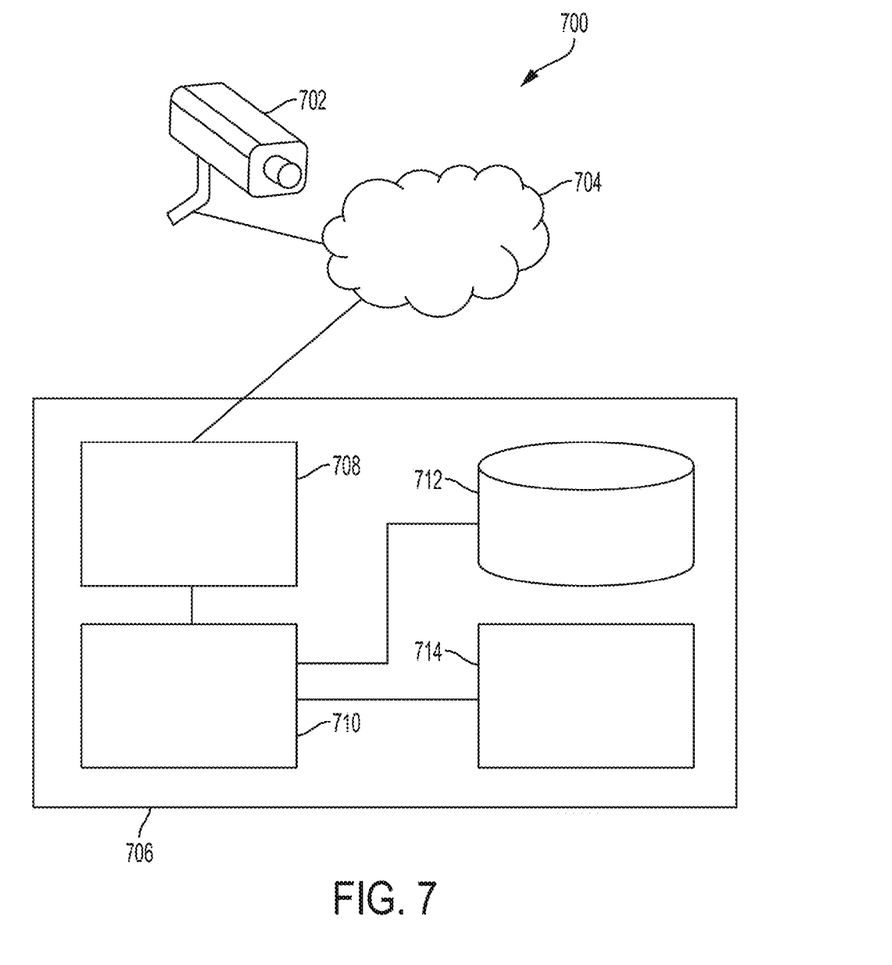
FIG. 7 depicts example implementation hardware according to some embodiments.

FIG. 7 depicts example implementation hardware 700 according to some embodiments. The techniques disclosed herein, e.g., in reference to FIG. 2, may be implemented using the system shown and described in reference to FIG. 7. In particular, FIG. 7 depicts video camera 702 in communication with processing hardware 706. Implementation hardware 700 may be entirely contained in a vehicle (e.g., a submarine) according to some embodiments.

Processing hardware 706 may include one or more electronic processors 710, communicatively coupled to computer readable media 712 (e.g., persistent memory), parallel processors 714, and interface 708. Processor(s) 710 may form part of an electronic computer, for example. Parallel processors 714 may be graphics processors for example and may be used to perform the signal processing operations disclosed herein, e.g., any, or any combination, of: MRF processing and video inpainting. Transmission interface 708 may be coupled to network 704, which conveys data to/from video camera 702. In some embodiments, video camera 702 may convey video data directly to processors 710, without the use of a network such as network 704. Computer readable media 712 may include computer-interpretable instructions which, when executed by processor(s) 710 and/or parallel processors 714, cause processing hardware 706 to perform one or more of the techniques disclosed herein.

In general, systems capable of performing the presented techniques may take many different forms. Further, the functionality of one portion of the system may be substituted into another portion of the system. Each hardware component may include one or more processors coupled to random access memory operating under control of, or in conjunction with, an operating system. The system can include network interfaces to connect with clients through a network. Such interfaces can include one or more servers. Appropriate networks include the internet, as well as smaller networks such as wide area networks (WAN) and local area networks (LAN). Networks internal to businesses or enterprises are also contemplated. Further, each hardware component can include persistent storage, such as a hard drive or drive array, which can store program instructions to perform the techniques presented herein. Other configurations of hardware, software, and service resources are possible.

The foregoing description is illustrative, and variations in configuration and implementation are possible. For example, resources described as singular can be plural, and resources described as integrated can be distributed. Further, resources described as multiple or distributed can be combined. The scope of the presented techniques is accordingly intended to be limited only by the following claims.

What is claimed is:

1. A computer implemented image processing method of removing an obstruction from a video image stream, the method comprising:
obtaining an electronic representation of a video image stream comprising a plurality of pixels, each pixel of the plurality of pixels comprising a time and a location;
modeling, by at least one electronic processor, each of a plurality of video image layers as dynamic textures;
assigning, by at least one electronic parallel processor, each of the plurality of pixels to one of the plurality of video image layers, wherein each layer represents scene elements that are a certain distance from a camera image plane of the video image stream;
determining, by at least one electronic processor, a particular layer of the plurality of video image layers in which the obstruction occurs;
inpainting, by at least one electronic processor, on the particular layer, a region of the video image stream corresponding to the obstruction; and
providing the video stream subsequent to the video inpainting.

2. The method of claim 1, wherein the obstruction comprises a smudge on a lens of an imaging system that produced the video image stream.

3. The method of claim 2, wherein the lens is mounted outside a building, or the lens is mounted outside a vehicle.

4. The method of claim 3, wherein the lens is mounted outside a submarine, and wherein a periscope of the submarine comprises the lens.

5. The method of claim 1, wherein the modeling each of a plurality of video image layers as a dynamic texture comprises modeling each of a plurality of video image layers using a respective linear dynamic system.

6. The method of claim 1, wherein the assigning each of the plurality of pixels to one of the plurality of video image layers comprises applying a layered dynamic texture model.

7. The method of claim 6, wherein the assigning each of the plurality of pixels to one of the plurality of video image layers further comprises implementing a variational approximation of an expectation-maximization algorithm.

8. The method of claim 6, wherein the applying the layered dynamic texture model comprises forming a Markov random field representing a plurality of discrete hidden variables.

9. The method of claim 1,
wherein the video image stream comprises a representation of a reticle, and
wherein the determining a particular layer of the plurality of video image layers in which the obstruction occurs comprises comparing a dynamics of a video image layer comprising the reticle to a dynamics of each of the plurality of video image layers.

10. The method of claim 1, wherein the determining a particular layer of the plurality of video image layers in which the obstruction occurs comprises comparing each of the plurality of video image layers to a supervised learning regression model of motion.

11. The method of claim 1, wherein the assigning, by at least one electronic parallel processor, each of the plurality of pixels to one of the plurality of video image layers comprises assigning, by at least one electronic video processor, each of the plurality of pixels to one of the plurality of video image layers.

12. The method of claim 1, wherein the inpainting, on the particular layer, a region of the video image stream corresponding to the obstruction comprises, for each of a second plurality of pixels comprising the obstruction, identifying a corresponding candidate frame from the video image stream in which the pixel of the second plurality of pixels is not present.

13. An image processing system for removing an obstruction from a video image stream, the system comprising:
at least one electronic interface configured to obtain an electronic representation of a video image stream comprising a plurality of pixels, each pixel of the plurality of pixels comprising a time and a location;
at least one electronic processor configured to model each of a plurality of video image layers as dynamic textures;
at least one electronic parallel processor configured to assign each of the plurality of pixels to one of the plurality of video image layers, wherein each layer represents scene elements that are a certain distance from a camera image plane of the video image stream;
at least one electronic processor configured to determine a particular layer of the plurality of video image layers in which the obstruction occurs;
at least one electronic processor configured to inpaint on the particular layer, a region of the video image stream corresponding to the obstruction; and
at least one electronic interface configured to provide the video stream subsequent to the video inpainting.

14. The system of claim 13, wherein the obstruction comprises a smudge on a lens of an imaging system that produced the video image stream.

15. The system of claim 14, wherein the lens is mounted outside a building, or the lens is mounted outside a vehicle.

16. The system of claim 15, wherein the lens is mounted outside a submarine, and wherein a periscope of the submarine comprises the lens.

17. The system of claim 13, wherein the at least one electronic processor configured to model each of a plurality of video image layers as a dynamic texture comprises at least one electronic processor configured to model each of a plurality of video image layers using a respective linear dynamic system.

18. The system of claim 13, wherein the at least one electronic parallel processor configured to assign each of the plurality of pixels to one of the plurality of video image layers comprises at least one electronic parallel processor configured to apply a layered dynamic texture model.

19. The system of claim 18, wherein the at least one electronic parallel processor configured to assign each of the plurality of pixels to one of the plurality of video image layers further comprises at least one electronic parallel processor configured to implement a variational approximation of an expectation-maximization algorithm.

20. The system of claim 18, wherein the at least one electronic parallel processor configured to implement the layered dynamic texture model comprises at least one electronic parallel processor configured to form a Markov random field representing a plurality of discrete hidden variables.

21. The system of claim 13,
wherein the video image stream comprises a representation of a reticle, and
wherein the at least one electronic processor configured to determine a particular layer of the plurality of video image layers in which the obstruction occurs comprises at least one electronic processor configured to compare a dynamics of a video image layer comprising the reticle to a dynamics of each of the plurality of video image layers.

22. The system of claim 13, wherein the at least one electronic processor configured to determine a particular layer of the plurality of video image layers in which the obstruction occurs comprises at least one electronic processor configured to compare each of the plurality of video image layers to a supervised learning regression model of motion.

23. The system of claim 13, wherein the at least one electronic parallel processor configured to assign each of the plurality of pixels to one of the plurality of video image layers comprises at least one electronic video processor configured to assign each of the plurality of pixels to one of the plurality of video image layers.

24. The system of claim 13, wherein the at least one electronic processor configured to inpaint, on the particular layer, a region of the video image stream corresponding to the obstruction comprises, at least one electronic processor configured to identify, for each of a second plurality of pixels comprising the obstruction, a corresponding candidate frame from the video image stream in which the pixel of the second plurality of pixels is not present.

* * * * *